United States Patent
Chen et al.

(10) Patent No.: US 8,583,964 B2
(45) Date of Patent: Nov. 12, 2013

(54) IDENTIFYING BUGS IN A DATABASE SYSTEM ENVIRONMENT

(75) Inventors: Zhiqiang Chen, San Ramon, CA (US);
Anjesh Dubey, Sunnyvale, CA (US);
Worley Ortiz, San Francisco, CA (US);
Mark A. Fischer, Ashland, OR (US);
Thom Kim, San Francisco, CA (US);
Andrew Tsui, San Francisco, CA (US);
Fiaz Hossain, San Francisco, CA (US);
Pallav Kothari, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 389 days.

(21) Appl. No.: 12/977,597

(22) Filed: Dec. 23, 2010

(65) Prior Publication Data
US 2012/0005537 A1 Jan. 5, 2012

Related U.S. Application Data

(60) Provisional application No. 61/349,711, filed on May 28, 2010.

(51) Int. Cl.
*G06F 11/00* (2006.01)
(52) U.S. Cl.
USPC .......................................... 714/38.1; 714/25
(58) Field of Classification Search
USPC .................. 714/25, 37, 38.1, 41; 717/124
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,634,098 A * | 5/1997 | Janniro et al. | 714/38.1 |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |

(Continued)

*Primary Examiner* — Marc Duncan
(74) *Attorney, Agent, or Firm* — Ingrassia Fisher & Lorenz, P.C.

(57) ABSTRACT

A system and method for identifying bugs in a database system. In one embodiment, a method includes running a plurality of tests on a software application, and rerunning one or more tests of the plurality of tests. The method also includes identifying one or more bugs in the one or more tests based on inconsistent test results.

22 Claims, 4 Drawing Sheets

(56) References Cited

U.S. PATENT DOCUMENTS

| | | |
|---|---|---|
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,715,108 B1 * | 3/2004 | Badger et al. ............... 714/38.1 |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson et al. |
| 7,698,160 B2 | 4/2010 | Beaven et al. |
| 7,779,303 B2 * | 8/2010 | Stubbs et al. ............... 714/38.14 |
| 8,082,301 B2 | 12/2011 | Ahlgren et al. |
| 8,095,413 B1 | 1/2012 | Beaven |
| 8,095,594 B2 | 1/2012 | Beaven et al. |
| 8,266,592 B2 * | 9/2012 | Beto et al. ............... 717/124 |
| 8,275,836 B2 | 9/2012 | Beaven et al. |
| 8,276,021 B2 * | 9/2012 | Dern et al. ............... 714/35 |
| 8,417,999 B2 * | 4/2013 | Calinoiu et al. ............... 714/38.1 |
| 8,434,058 B1 * | 4/2013 | Hudgons et al. ............... 717/106 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0107121 A1 * | 5/2006 | Mendrala et al. ............... 714/38 |
| 2007/0168734 A1 * | 7/2007 | Vasile ............... 714/33 |
| 2009/0307763 A1 * | 12/2009 | Rawlins et al. ............... 726/5 |
| 2012/0324289 A1 * | 12/2012 | Funnell ............... 714/32 |

* cited by examiner

IDENTIFYING BUGS IN A DATABASE SYSTEM ENVIRONMENT

CLAIM OF PRIORITY

This application claims the benefit of U.S. Provisional Patent Application 60/61/349,711 entitled, "Methods and Systems for Identifying Bugs in a Multi-Tenant Database System Environment," filed May 28, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to testing in a database network system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which, in and of themselves, may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. Software applications used in the database system are used to facilitate data retrieval as well as to carry out other operations of the database system. To ensure proper and efficient operations of the database system, software applications need to be tested periodically. Unfortunately, testing a software application can be inaccurate.

BRIEF SUMMARY

Embodiments provide mechanisms and methods for identifying bugs in a database system. In one embodiment, a method includes running a plurality of tests on a software application, and rerunning one or more tests of the plurality of tests. The method also includes identifying one or more bugs in the one or more tests based on inconsistent test results.

While one or more implementations and techniques are described, one or more embodiments may be implemented in a system having an application server providing a front end for an on-demand database service capable of supporting multiple tenants. The embodiments described herein are not limited to multi-tenant databases or deployment on application servers. Embodiments may be practiced using other database architectures, i.e., ORACLE®, DB2® by IBM and the like, without departing from the scope of the embodiments claimed.

Any of the above embodiments may be used alone or together with one another in any combination. Embodiments described herein may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the embodiments described are not limited to the examples depicted in the figures.

DETAILED DESCRIPTION

General Overview

Systems and methods are provided for identifying bugs in a database system environment.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers.

Next, mechanisms and methods for identifying bugs in a database system environment will be described with reference to example embodiments.

System Overview

Embodiments described herein enable and facilitate the identification of bugs in a database system environment such as an on-demand database services system. As described in more detail below, such bugs are identified in code for automated tests for testing a software application that is implemented in the database system environment. Automated tests that have bugs may be referred to as flappers. A problem with flappers is that they pass or fail independent of actual changes or in the absence of changes to the software application, which result in undeterministic results. For example, without any code change to the software application, a given test result can indicate a pass after one test run and then indicate a fail after a subsequent test run, and vice versa. Consequently, flappers affect the accuracy of test automation results in that one might erroneously attribute a failure to a change in the software application. In actuality, the failure may not be caused by any change in the software application but instead be caused by a flapper.

Embodiments describe herein detect such flappers in order to filter erroneous results from flappers, and so that the test owner (writer of the test code) may be notified. For example, in one embodiment, tests are run against a software application. Some tests (e.g., failing tests) are then rerun against the software application. Flappers are then identified based on inconsistent test results. When testing the same version of the software application (e.g., no code changes), the tests should have consistent results. Inconsistent results are indicative of flappers. Embodiments describe herein are directed to detecting different potential causes of flappers. Specific embodiments of this process are described in more detail below.

Figure 1:
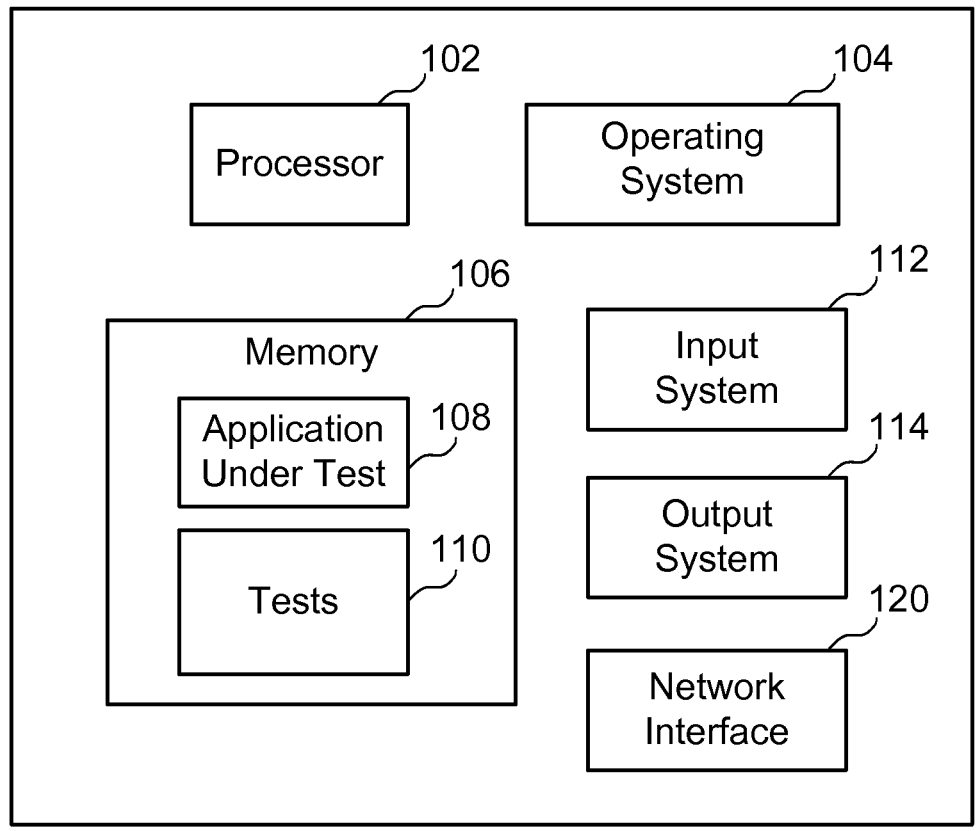
FIG. 1 illustrates a block diagram of an example system, which may be used to implement the embodiments described herein.

FIG. 1 illustrates a block diagram of an example system 100, which may be used to implement the embodiments described herein. As FIG. 1 shows, system 100 includes a processor 102, an operating system 104, a memory 106, a software application under test 108, tests 110 for testing software application 108, an input system 112, an output system 114, and a network interface 120. For ease of illustration, FIG. 1 shows one block for each of processor 102 and memory 106. These blocks 102 and 106 may represent multiple processors and memory units. Software application 108 and tests 110 may be stored on memory 106 or on any other suitable storage location or computer-readable medium.

Figure 3:
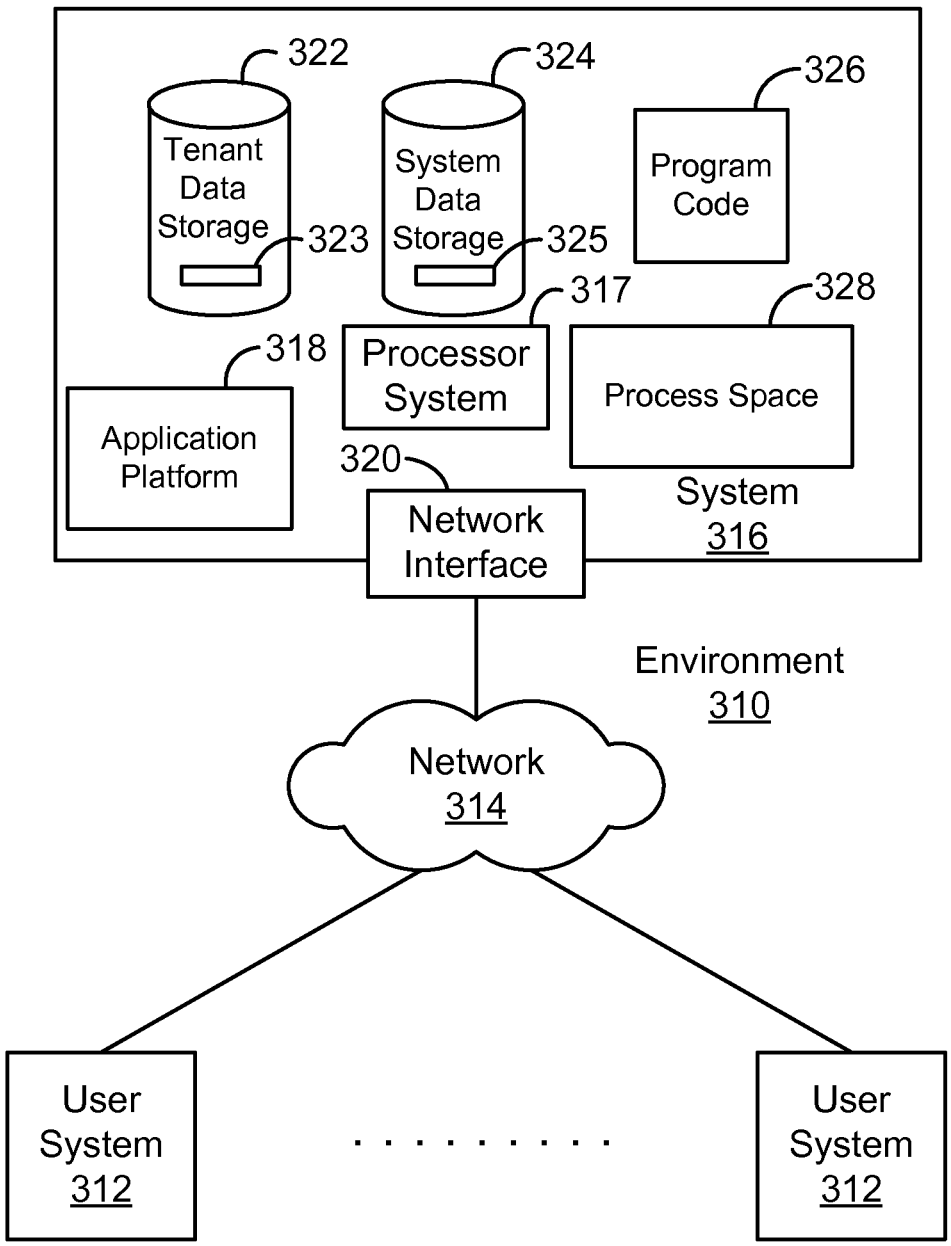
FIG. 3 illustrates a block diagram of an example environment where a database service might be used, and which may be used to implement the embodiments described herein.

In one embodiment, tests 110 provide instructions that enable the processor 102 of system 100 to perform the functions described herein, such as the steps described in FIG. 3. Input system 112 may include input devices such as a keyboard, a mouse, etc., and other means for receiving information from a user and/or from other devices. Output system 114 may include output devices such as a monitor, a printer, etc., and other means for outputting information to a user and/or to other devices.

While system 100 is described as performing the steps as described in the embodiments herein, any suitable component or combination of components of system 100 or any suitable processor or processors associated with system 100 may perform the steps described. For example, the steps may be performed by processor system 317 or process space 328 of FIG. 3, by system process 402 of FIG. 4, or by any other suitable processor or processors associated with system 100.

Figure 2:
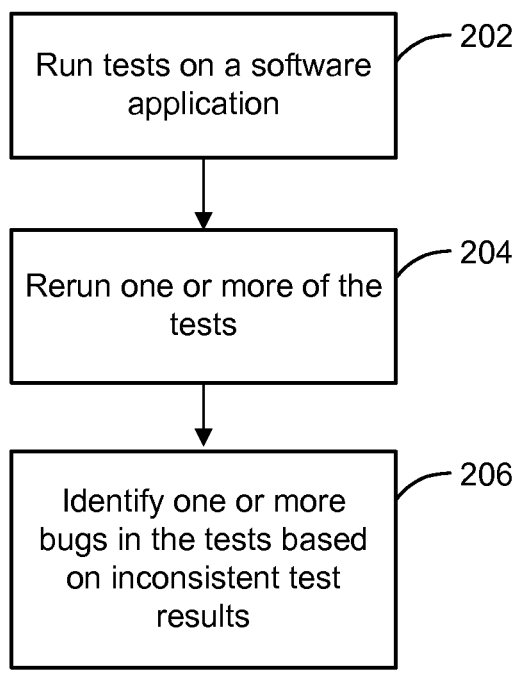
FIG. 2 illustrates an example simplified flow diagram for identifying bugs in a database system, according to one embodiment.

FIG. 2 illustrates an example simplified flow diagram for identifying bugs in a system, according to one embodiment. In one embodiment, the system may be a database system. Referring to both FIGS. 1 and 2, the method is initiated in block 202, where system 100 runs tests 110 on software application 108. Tests 110 validate the functionality of software application 108, and different tests test different functionalities. In one embodiment, if one or more tests 110 fail, at least these tests are rerun against software 108, as described below.

In block 204, system 100 reruns one or more tests of the plurality of tests against software 108. As noted above, the purpose of the tests is to validate functionality of a software application. If there is no change to the software application, the status of each test should not change. However, as indicated above, flappers pass or fail independent of changes made to the software application, making test results unpredictable. For example, a test may result in a failure when no change has been made to the software application, or may result in a failure that is unrelated to an actual change. By rerunning some of the tests against the software application, system 100 may determine if there are any inconsistencies in the tests, where an inconsistency would indicate a flapper.

In one embodiment, system 100 reruns the tests a predetermined number of times. For example, system 100 may rerun the tests anywhere in the range of 50 to 100 times. Other numbers of times and other ranges are possible, depending on the specific implementation. Rerunning the tests multiple time increases the chances of finding a flapper. In other words, the probability that a given test is not a flapper increases the more times the test consistently passes or consistently fails.

The rerunning of the tests may be performed using different testing parameters. For example, in one embodiment, system 100 reruns only the failing tests. In one embodiment, system 100 reruns all of the tests. In one embodiment, system 100 performs the rerunning of the tests immediately. In one embodiment, system 100 performs the rerunning of the tests at a predefined time period (e.g., after hours, in the evening, etc.). In one embodiment, system 100 performs the rerunning of the tests in a different test environment. Any combination of these testing parameters is possible. Detailed examples of these testing parameters are discussed further below.

In block 206, system 100 identifies one or more bugs (e.g., flappers) in the one or more tests based on inconsistent test results. For example, in one embodiment, assume a given test fails during a first run (e.g., at block 102) but then passes during a subsequent run (e.g., at block 104), where there were no new changes to software application 108. System 100 would render the test a flapper due to these inconsistent test results. Conversely, in one embodiment, assume a given test passes during a first run (e.g., at block 102) but then fails during a subsequent run (e.g., at block 104), where there were no new changes to software application 108. System 100 would also render the test a flapper due to these inconsistent test results.

Embodiments described herein identify flappers in order to determine whether a given test failure is a true test failure or a flapper. A true test failure is a failure or bug caused by the software application (e.g., caused by a change in the software application), as opposed to a flapper, which is a failure or bug in test code. A detection of a true test failure is used to provide feedback for software developers. A detection of a flapper is used to provide feedback for test owners (e.g., test developers) so that the test owner can investigate the cause of the flapper.

The causes of flappers may vary. For example, in some situations the cause may be the test itself, the software application, the test environment, the time of day, or any combination of these factors. Embodiments described herein identify the flappers foremost, and may also provide data as to possible causes of particular flappers.

The following are example scenarios illustrating how system 100 identifies flappers, according to several embodiments. Using the same software application version (e.g., no code changes), the tests should have consistent results. Each of the example scenarios described below is directed to a different potential cause of a given one or more flappers. Note that the phrases software application version, version, software application revision, revision, and change list are used interchangeably. The same software application version means that the code has not been changed. A new software application version means that the code has been changed.

Example Scenario 1

In this scenario, system 100 runs tests 110 on software application 108 (e.g., a first test run). If one or more tests fail, system 100 immediately reruns the failing tests on the same test machine (e.g., a second test run). For example, assume that system 100 performs 10 tests and that there were zero failures before the first run. System 100 immediately reruns any new test failures on the same test machine without exiting the test application. In one embodiment, system 100 reruns only the failing tests. In one embodiment, system 100 reruns all the tests. System 100 then determines if there are any flappers in the failing tests based on inconsistent test results. Any inconsistency in test results for particular tests would render those tests as flappers. For example, if a given test fails on the previous test run (e.g., first test run) and then passes on the subsequent test run (e.g., second test run) at the same software application version, system 100 deems the test as a flapper.

In one embodiment, a new (sibling) test machine comparable to system 100 may rebuild the same software application version and use an equivalent test environment as system 100 to rerun the new test failures.

Example Scenario 2

In this scenario, system 100 runs tests 110 on a software application 108. If any tests fail, system 100 performs a full rerun, where system 100 reruns all of the tests on different test machines one or more times against the same version of software application 108. In one embodiment, system 100 reruns these tests during a predetermined time period (e.g., during off peak hours). System 100 determines if there are any flappers based on inconsistent test results. The results from all those runs should be consistent in terms of the number of tests passing and failing. Any inconsistency in test results for particular tests would render those tests as flappers. This example scenario differs from the first scenario described above in that the tests are rerun at a different time (e.g., at night), and rerun on different test machines (e.g., different environments).

In the first example scenario described above (where tests are rerun immediately without exiting the test application), there may be different results, because a previous test in the same test run may change the state of software application 108 and not change the state back. As such, a subsequent test could fail because of the state change. If the previous test did not run, the subsequent test might not fail. Accordingly, if all of the tests were rerun as in this second example scenario, the subsequent test would fail. Even with such test dependencies, by being rerun on different test machines, system 100 would determine that the failures are true failures if each of the test machines produced the same results. System 100 would identify any flappers from any inconsistencies in the test results.

Example Scenario 3

In this scenario, system 100 runs tests 110 on software application 108. If any tests fail, system 100 reruns the tests against different versions of the software application. In one embodiment, the rerunning of the tests is performed on the new failed tests that previously passed. In one embodiment, the rerunning of the tests is performed on a first version of the software application where the new failed tests first occurred, and performed on a most recent version of the software application where the new failed tests previously passed.

For example, assume that system 100 determines that the most recent version of software application 108, where there are 0 failures (or no new failures), is change list 4. Assume that system 100 also determines that the first version of software application 108, where there are is a new failure, is change list 5 (where there are 2 new failures, for example). It is possible that the 2 tests that failed are true failures caused by change list 5. It is also possible that the 2 tests that failed are flappers.

In this example, system 100 rebuilds change list 5 and reruns the 2 failing tests in order to confirm that the 2 failing tests are true failures and not flappers. System 100 identifies one or more flappers based on whether there are any inconsistent test results. If the 2 tests fail again, system 100 deems the 2 failing tests to be true failures. If the 2 tests pass, however, system 100 deems the 2 failing tests to be flappers, because they failed on the previous test run against change list 5 and then passed on the subsequent test run against change list 5. In one embodiment, system 100 also rebuilds change list 4 and reruns the 2 failing tests, where they would be expected to pass. If the tests fail, the tests are flappers, because they passed in the previous test run at change list 4. In other words, these tests are flappers, because of inconsistent test results at change list 4.

In these embodiments, where system 100 rebuilds the software for particular versions (e.g., particular change lists), for each rebuild, the test process from the previous test run is terminated, all states of the software application are reset, associated databases are refreshed to clean copies. Essentially, a new test machine is created to rerun one or more tests against each change list.

FIG. 3 illustrates a block diagram of an example environment 310 where a database service might be used, and which may be used to implement the embodiments described herein. Environment 310 may include user systems 312, network 314, system 316, processor system 317, application platform 318, network interface 320, tenant data storage 322, system data storage 324, program code 326, and process space 328. In other embodiments, environment 310 may not have all of the components listed and/or may have other elements instead of, or in addition to, those listed above.

Environment 310 is an environment in which an on-demand database service exists. User system 312 may be any test machine or system that is used by a user to access a database user system. For example, any of user systems 312 can be a handheld computing device, a mobile phone, a laptop computer, a work station, and/or a network of computing devices. As illustrated in FIG. 3 (and in more detail in FIG. 4) user systems 312 might interact via a network 314 with an on-demand database service, which is system 316. System 316 may also be referred to as a cloud service provider. System 316 provides its resources to customers (e.g., end users) as a service.

An on-demand database service, such as system 316, is a database system that is made available to outside users who do not need to necessarily be concerned with building and/or maintaining the database system, but instead may be available for more general use when the users need the database system (e.g., on the demand of the users). Some on-demand database services may store information from one or more tenants stored into tables of a common database image to form a multi-tenant database system (MTS). Accordingly, "on-demand database service 316" and "system 316" will be used interchangeably herein. A database image may include one or more database objects. A relational database management system (RDMS) or the equivalent may execute storage and retrieval of information against the database object(s). Application platform 318 may be a framework that allows the applications of system 316 to run, such as the hardware and/or software, e.g., the operating system. In an embodiment, system 316 may include an application platform 318 that enables creating, managing, and executing one or more applications developed for an on-demand database service, for users accessing the on-demand database service via user systems 312, or for third party application developers accessing the on-demand database service via user systems 312.

The users of user systems 312 may differ in their respective capacities, and the capacity of a particular user system 312 might be entirely determined by permissions (permission levels) for the current user. For example, where a salesperson is using a particular user system 312 to interact with system 316, that user system has the capacities allotted to that salesperson. However, while an administrator is using that user system to interact with system 316, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 314 is any network or combination of networks of devices that communicate with one another. For example, network 314 can be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global internetwork of networks often referred to as the "Internet" with a capital "I." That network will be used in many of the examples herein. However, it should be understood that the networks used with the embodiment described herein use are not so limited, although TCP/IP is a frequently implemented protocol.

User systems 312 might communicate with system 316 using TCP/IP and, at a higher network level, use other common Internet protocols to communicate, such as hypertext transfer protocol (HTTP), file transfer protocol (FTP), Andrew file system (AFS), wireless application protocol (WAP), etc. In an example where HTTP is used, user system 312 might include an HTTP client commonly referred to as a "browser" for sending and receiving HTTP messages to and from an HTTP server at system 316. Such an HTTP server might be implemented as the sole network interface between system 316 and network 314, but other techniques might be used as well or instead. In some implementations, the interface between system 316 and network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 316, shown in FIG. 3, implements a web-based customer relationship management (CRM) system. For example, in one embodiment, system 316 includes application servers configured to implement and execute CRM software applications as well as to provide related data, code, forms, webpages and other information to and from user systems 312. The application servers are also configured to store to, and retrieve from, a database system related data, objects, and Webpage content. With a multi-tenant system, data for multiple tenants may be stored in the same physical database object. Tenant data may be arranged such that data of one tenant is kept logically separate from that of other tenants so that one tenant does not have access to another tenant's data, unless such data is expressly shared. In certain embodiments, system 316 implements applications other than, or in addition to, a CRM application. For example, system 316 may provide tenant access to multiple hosted (standard and custom) applications, including a CRM application. User (or third party application developer) software applications, which may or may not include CRM, may be supported by the application platform 318, which manages the creation and storage of the applications into one or more database objects, and executing of the applications in a virtual machine in the process space of the system 316. The terms "application," "software application," "software package," "software code," and "program code" are used interchangeably.

One arrangement for elements of system 316 is shown in FIG. 3, including a network interface 320, application platform 318, tenant data storage 322 for tenant data 323, system data storage 324 for system data 325 accessible to system 316 and possibly multiple tenants, program code 326 for implementing various functions of system 316, and a process space 328 for executing MTS system processes and tenant-specific processes, such as running applications as part of an application hosting service. Additional processes that may execute on system 316 include database indexing processes.

Several elements in the system shown in FIG. 3 include conventional, well-known elements that are explained only briefly here. For example, each user system 312 could include a desktop personal computer, workstation, laptop, PDA, cell phone, or any wireless access protocol (WAP) enabled device or any other computing device capable of interfacing directly or indirectly to the Internet or other network connection. User system 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 312 to access, process and view information, pages and applications available to it from system 316 over network 314. Each user system 312 also typically includes one or more user interface devices, such as a keyboard, a mouse, trackball, touch pad, touch screen, pen or the like, for interacting with a graphical user interface (GUI) provided by the browser on a display (e.g., a monitor screen, liquid crystal display (LCD) monitor, etc.) in conjunction with pages, forms, applications and other information provided by system 316 or other systems or servers. For example, the user interface device can be used to access data and applications hosted by system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 312 and all of its components are operator configurable using applications, such as a browser, including computer code run using a central processing unit such as an Intel Pentium® processor or the like. Similarly, system 316 (and additional instances of an MTS, where more than one is present) and all of their components might be operator configurable using application(s) including computer code to run using a central processing unit such as processor system 317, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a read-only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory integrated circuits (ICs)), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 316 is configured to provide webpages, forms, applications, data and media content to user (client) systems 312 to support the access by user systems 312 as tenants of system 316. As such, system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., object oriented database management system (OODBMS) or rational database management system (RDBMS)) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 4:
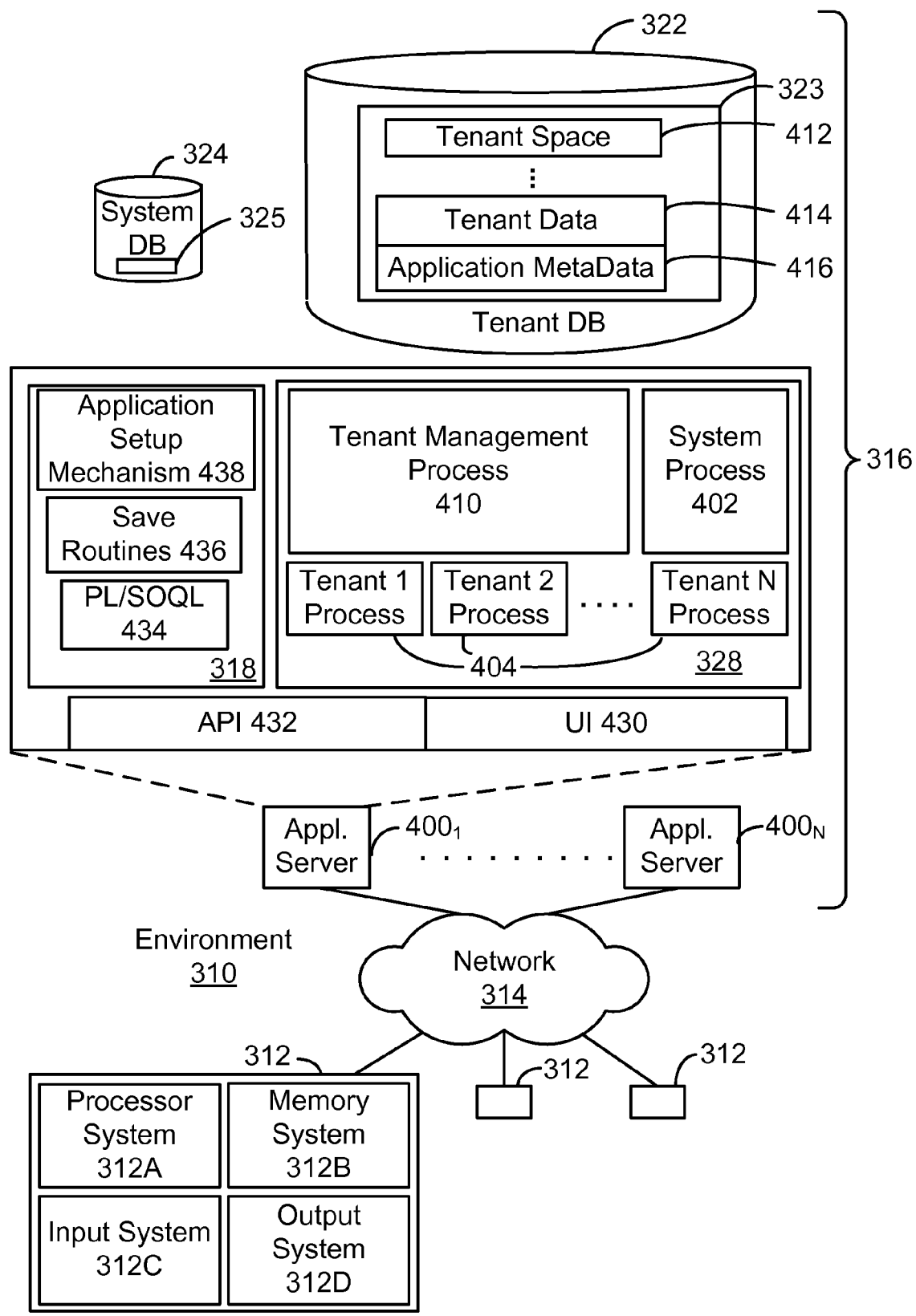
FIG. 4 illustrates a block diagram of another example environment, which may be used to implement the embodiments described herein.

FIG. 4 illustrates a block diagram of another example environment 310, which may be used to implement the embodiments described herein. FIG. 4 also illustrates elements of system 316 and various interconnections, according to one embodiment. FIG. 4 shows that user system 312 may include processor system 312A, memory system 312B, input system 312C, and output system 312D. FIG. 4 shows network 314 and system 316. FIG. 4 also shows that system 316 may include tenant data storage 322, tenant data 323, system data storage 324, system data 325, user interface (UI) 430, application program interface (API) 432, PL/Salesforce.com object query language (PL/SOQL) 434, save routines 436, application setup mechanism 438, applications servers $400_1$-$400_N$, system process space 402, tenant process spaces 404, tenant management process space 410, tenant storage area 412 (labeled "Tenant Space 412" in FIG. 4), user storage 414 (labeled "Tenant Data 414" in FIG. 4), and application metadata 416. In other embodiments, environment 310 may not have the same elements as those listed above and/or may have other elements instead of, or in addition to, those listed above.

User system 312, network 314, system 316, tenant data storage 322, and system data storage 324 were discussed above in FIG. 3. Regarding user system 312, processor system 312A may be any combination of one or more processors. Memory system 312B may be any combination of one or more memory devices, short term, and/or long term memory. Input system 312C may be any combination of input devices, such as one or more keyboards, mice, trackballs, scanners, cameras, and/or interfaces to networks. Output system 312D may be any combination of output devices, such as one or more monitors, printers, and/or interfaces to networks. As shown in FIG. 3, system 316 may include a network interface 320 (of FIG. 3) implemented as a set of HTTP application servers 400, an application platform 318, tenant data storage 322, and system data storage 324. Also shown is system process space 402, including individual tenant process spaces 404 and a tenant management process space 410. Each application server 400 may be configured to tenant data storage 322 and the tenant data 323 therein, and system data storage 324 and the system data 325 therein to serve requests of user systems 312. The tenant data 323 might be divided into individual tenant storage areas 412, which can be either a physical arrangement and/or a logical arrangement of data. Within each tenant storage area 412, user storage 414 and application metadata 416 might be similarly allocated for each user. For example, a copy of a user's most recently used (MRU) items might be stored to user storage 414. Similarly, a copy of MRU items for an entire organization that is a tenant might be stored to tenant storage area 412. A UI 430 provides a user interface and an API 432 provides an application programmer interface to system 316 resident processes and to users and/or developers at user systems 312. The tenant data and the system data may be stored in various databases, such as one or more Oracle™ databases.

Application platform 318 includes an application setup mechanism 438 that supports application developers' creation and management of applications, which may be saved as metadata into tenant data storage 322 by save routines 436 for execution by subscribers as one or more tenant process spaces 404 managed by tenant management process 410, for example. Invocations to such applications may be coded using PL/SOQL 434 that provides a programming language style interface extension to API 432. Invocations to applications may be detected by one or more system processes, which manage retrieving application metadata 416 for the subscriber, making the invocation and executing the metadata as an application in a virtual machine.

Each application server 400 may be communicably coupled to database systems, e.g., having access to system data 325 and tenant data 323, via a different network connection. For example, one application server 400$_1$ might be coupled via the network 314 (e.g., the Internet), another application server 400$_{N-1}$ might be coupled via a direct network link, and another application server 400$_N$ might be coupled by yet a different network connection. Transfer control protocol and Internet protocol (TCP/IP) are typical protocols for communicating between application servers 400 and the database system. However, it will be apparent to one skilled in the art that other transport protocols may be used to optimize the system depending on the network connection used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, system 316 is multi-tenant, wherein system 316 handles the storage of, and access to, different objects, data and applications across disparate users and organizations.

As an example of storage, one tenant might be a company that employs a sales force where each salesperson uses system 316 to manage his or her sales process. Thus, a user might maintain contact data, leads data, customer follow-up data, performance data, goals and progress data, etc., all applicable to that user's personal sales process (e.g., in tenant data storage 322). In an example of an MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 316 might also maintain system level data usable by multiple tenants or other data. Such system level data might include industry reports, news, postings, and the like that are sharable among tenants.

In certain embodiments, user systems 312 (which may be client systems) communicate with application servers 400 to request and update system-level and tenant-level data from system 316 that may require sending one or more queries to tenant data storage 322 and/or system data storage 324. System 316 (e.g., an application server 400 in system 316) automatically generates one or more structured query language (SQL) statements (e.g., one or more SQL queries) that are designed to access the desired information. System data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the embodiments described herein. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium (also referred to as a machine-readable storage medium) for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

While one or more implementations have been described by way of example and in terms of the specific embodiments, it is to be understood that the implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for identifying bugs in a database system, the method comprising:
    running a plurality of tests on a software application to generate first test results for each of the plurality of tests;
    rerunning one or more tests of the plurality of tests on the software application to generate subsequent test results for each of the one or more tests; and
    for any particular ones of the one or more tests that are determined to have subsequent test results that are inconsistent with the first test results, identifying those particular ones of the one or more tests as having bugs that cause those particular ones of the one or more tests to generate inconsistent test results.

2. The method of claim 1, wherein the rerunning comprises:
    rerunning only failing tests of the plurality of tests on the software application to generate subsequent test results for each of the one or more tests.

3. The method of claim 1, wherein the rerunning comprises:
    rerunning all of the tests of the plurality of tests on the software application to generate subsequent test results for each of the one or more tests.

4. The method of claim 1, wherein the rerunning is performed immediately.

5. The method of claim 1, wherein the rerunning is performed at a predefined time period.

6. The method of claim 1, wherein the running of the plurality of tests is performed on each of a plurality of versions of the software application,
    wherein the rerunning of the one or more tests is performed for one or more new failed tests that previously passed,
    wherein the rerunning of the tests is performed on a first version of the software application where the one or more new failed tests failed, and
    wherein the rerunning of the one or more tests is performed on a most recent version of the software application where the one or more new failed tests previously passed.

7. The method of claim 1, wherein the rerunning is performed in a different test environment.

8. A non-transitory computer-readable storage medium carrying one or more sequences of instructions thereon for identifying bugs in a database system, the instructions, when executed by a processor, cause the processor to perform:
    running a plurality of tests on a software application to generate first test results for each of the plurality of tests;
    rerunning one or more tests of the plurality of tests on the software application to generate subsequent test results for each of the one or more tests; and
    for any particular ones of the one or more tests that are determined to have subsequent test results that are inconsistent with the first test results, identifying those particular ones of the one or more tests as having bugs that cause those particular ones of the one or more tests to generate inconsistent test results.

9. The non-transitory computer-readable storage medium of claim 8, wherein the rerunning comprises:
    rerunning only failing tests of the plurality of tests on the software application to generate subsequent test results for each of the one or more tests.

10. The non-transitory computer-readable storage medium of claim 8, wherein the rerunning comprises:
    rerunning all of the tests of the plurality of tests on the software application to generate subsequent test results for each of the one or more tests.

11. The non-transitory computer-readable storage medium of claim 8, wherein the rerunning is performed immediately.

12. The non-transitory computer-readable storage medium of claim 8, wherein the rerunning is performed at a predefined time period.

13. The non-transitory computer-readable storage medium of claim 8, wherein the running of the plurality of tests is performed on each of a plurality of versions of the software application,
    wherein the rerunning of the one or more tests is performed for one or more new failed tests that previously passed,
    wherein the rerunning of the tests is performed on a first version of the software application where the one or more new failed tests failed, and wherein the rerunning of the one or more tests is performed on a most recent version of the software application where the one or more new failed tests previously passed.

14. The non-transitory computer-readable storage medium of claim 8, wherein the rerunning is performed in a different test environment.

15. An apparatus for identifying bugs in a database system, the apparatus comprising:
- a processor; and
- a storage device storing one or more stored sequences of instructions which when executed by the processor cause the processor to:
- run a plurality of tests on a software application to generate first test results for each of the plurality of tests;
- rerun one or more tests of the plurality of tests on the software application to generate subsequent test results for each of the one or more tests; and
- for any particular ones of the one or more tests that are determined to have subsequent test results that are inconsistent with the first test results, identify those particular ones of the one or more tests as having bugs that cause those particular ones of the one or more tests to generate inconsistent test results.

16. The apparatus of claim 15, wherein the stored sequences of instructions which when executed by the processor cause the processor to rerun only failing tests of the plurality of tests on the software application to generate subsequent test results for each of the one or more tests.

17. The apparatus of claim 15, wherein the stored sequences of instructions which when executed by the processor cause the processor to rerun all of the tests of the plurality of tests on the software application to generate subsequent test results for each of the one or more tests.

18. The apparatus of claim 15, wherein the stored sequences of instructions which when executed by the processor cause the processor to rerun one or more tests of the plurality of tests immediately.

19. The apparatus of claim 15, wherein the stored sequences of instructions which when executed by the processor cause the processor to rerun one or more tests of the plurality of tests at a predefined time period.

20. The apparatus of claim 15, wherein the running of the plurality of tests is performed on each of a plurality of versions of the software application,
- wherein the rerunning of the one or more tests is performed for one or more new failed tests that previously passed,
- wherein the rerunning of the tests is performed on a first version of the software application where the one or more new failed tests failed, and
- wherein the rerunning of the one or more tests is performed on a most recent version of the software application where the one or more new failed tests previously passed.

21. A method for identifying bugs in a database system, the method comprising:
- running a plurality of tests on a software application to generate first test results for each of the plurality of tests;
- rerunning one or more tests of the plurality of tests on the software application without having changed the software application to generate subsequent test results for each of the one or more tests; and
- for any particular ones of the one or more tests that are determined to have subsequent test results that are inconsistent with the first test results, identifying those particular ones of the one or more tests as having bugs that cause those particular ones of the one or more tests to generate inconsistent test results.

22. The method of claim 21, further comprising:
- comparing the subsequent test results to corresponding ones of the first test results.

* * * * *